No. 857,773. PATENTED JUNE 25, 1907.
J. TIBBITTS & A. W. TURNER.
FLOATING TIDAL WATER WHEEL.
APPLICATION FILED JULY 18, 1904.

2 SHEETS—SHEET 1.

Witnesses.
Albert E. Simons
Gus. J. H. Bradley

Inventors
John Tibbitts
Alfred William Turner
Per Alfred Wm Turner
Attorney

No. 857,773. PATENTED JUNE 25, 1907.
J. TIBBITTS & A. W. TURNER.
FLOATING TIDAL WATER WHEEL.
APPLICATION FILED JULY 18, 1904.

2 SHEETS—SHEET 2.

Witnesses:
Arthur R Gill
Joseph L Lawden

Inventors:
John Tibbitts
Alfred W Turner
per Alfred W Turner
Attorney

UNITED STATES PATENT OFFICE.

JOHN TIBBITTS, OF WALSALL, AND ALFRED WILLIAM TURNER, OF BIRMINGHAM, ENGLAND.

FLOATING TIDAL WATER-WHEEL.

No. 857,773.  Specification of Letters Patent.  Patented June 25, 1907.

Application filed July 18, 1904. Serial No. 217,154.

*To all whom it may concern:*

Be it known that we, JOHN TIBBITTS, residing at Vicarage House, Walsall, in the county of Stafford, England, and ALFRED WILLIAM TURNER, residing at Cobden Buildings, Corporation street, Birmingham, in the county of Warwick, England, subjects of the King of Great Britain, have invented certain new and useful Improvements in Floating Tidal Water-Wheels, of which the following is a specification.

This invention relates to tidal motors of the type in which a floating water wheel rising and falling with the rise and fall of the tide is revolved by means of the flow of the tide; and has for its object to increase the steadiness of the platform carrying the dynamo or machinery driven from the water wheel; to keep the machinery platform well above water level and so free from spray and waves and giving a strong, easily put together structure; and in addition a means of operating a crab in conjunction with toothed wheels whereby the driven machinery shaft shall be automatically caused to continue to rotate in one direction only through the direction of rotation of the water wheel changes with the ebb and flow of the tide.

Figure 1:
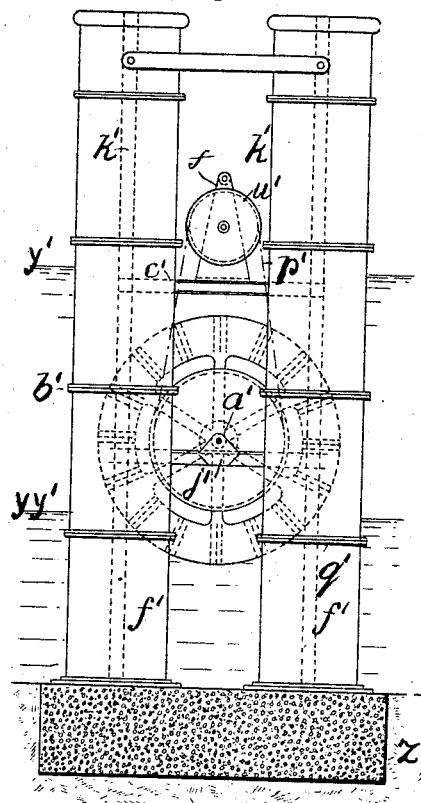
Figure 2:
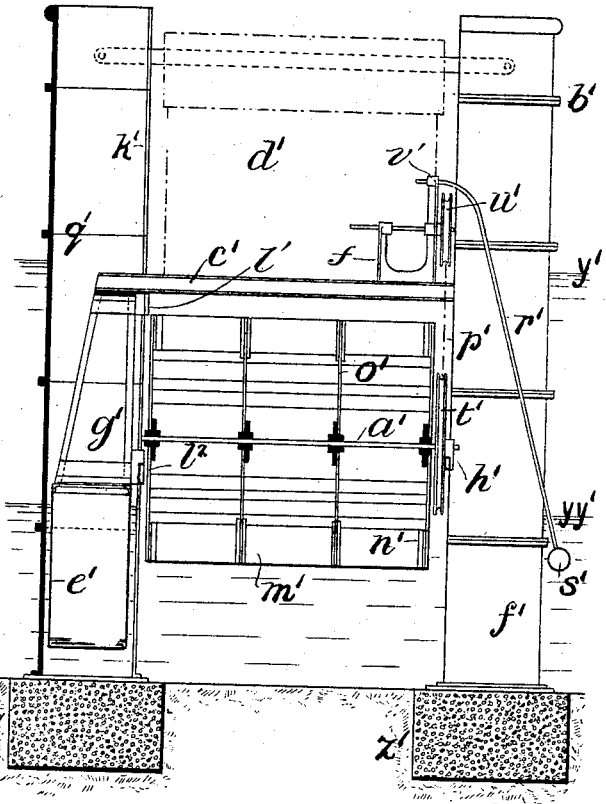
Figure 3:
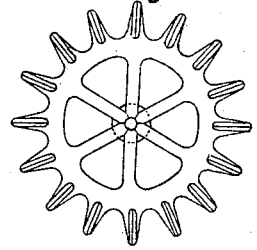
Figure 4:
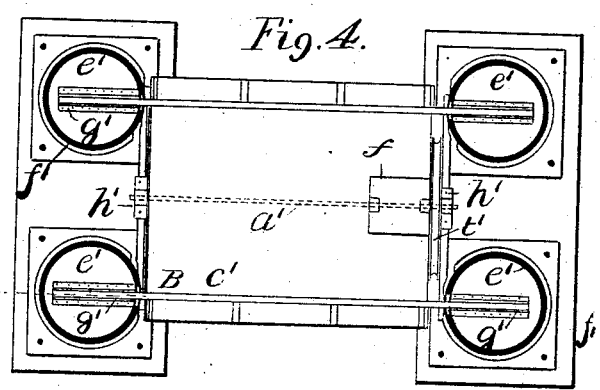
Figure 5:
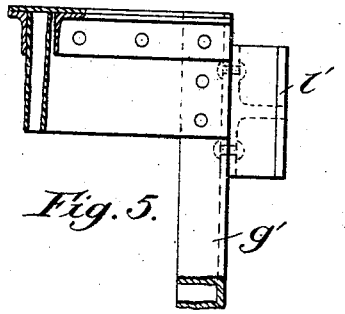
Figure 6:
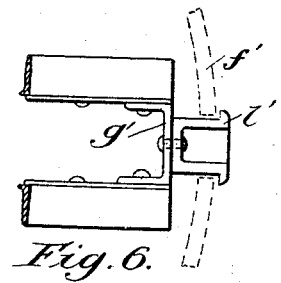
Figure 7:
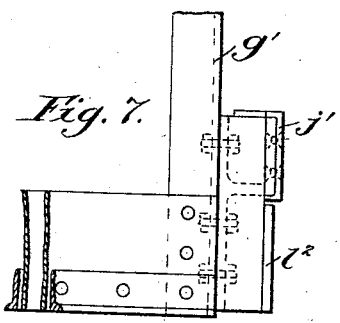
Figure 8:
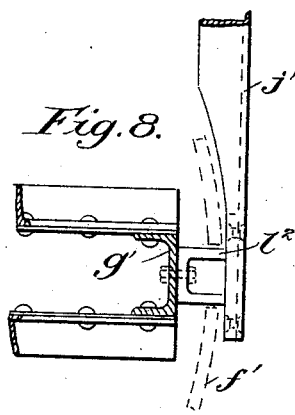
Figure 9:
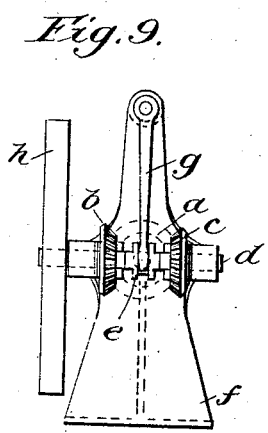
Figure 10:
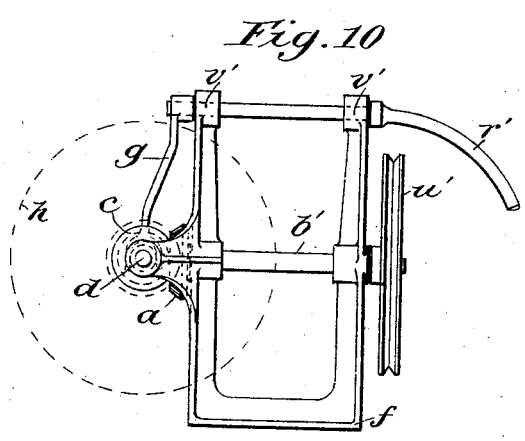

Referring to the drawings which form a part of this specification Figure 1 represents an end elevation of floating wheel structure. Fig. 2 represents a front elevation of Fig. 1 partly in section on line A. B. Fig. 4. Fig. 3 represents a front view of central cheeks of water wheel. Fig. 4 represents a plan of Fig. 2. Fig. 5 represents an enlarged broken off elevation of top of a standard $g'$ showing the guide $l'$ attached. Fig. 6 represents a plan of Fig. 5 with top plate removed. Fig. 7 represents an enlarged broken off elevation of bottom of a standard $g'$ showing the guide $l^2$ and cross girder $j'$, attached. Fig. 8 represents a plan of Fig. 7. Fig. 9 represents an enlarged front elevation of reversing crab worked by lever $r'$. Fig. 10 represents a side elevation of Fig. 9.

In carrying out our invention we use four separate buoys $e'$, such buoys are each inclosed in a tubular casing $f'$ so that such buoys can rise steadily from the low water level to the high water level without being affected by the action of the waves; the platform $c'$ rests on standards $g'$ attached to the top of the buoys $e'$; the bearings $h'$ for the wheel axle are carried by a cross girder $j'$ secured at each end to guides on the standards $g'$; a slot $k'$ is formed in each tubular casing through which the platform girders pass, and guides $l'$ and $l^2$ are secured to the standard to work within the slot $k'$ in tubular casings.

Figs. 5 to 8 show on an enlarged scale the guides $l'$ and $l^2$ and their connection to the standards $g'$ and to the cross girder $j'$, the guides are made of cast iron or steel the top one $l'$ could be bolted or riveted as is shown to the upright channel iron forming part of the standard $g'$, the lower guide $l^2$ is provided with flanges and made somewhat different to the top guide for the purpose of carrying one end of the cross girder $j'$, this guide is for convenience of erection preferably bolted to the channel iron of standard $g'$; the end of the girder $j'$ is cut away so as to clear the tubular casing shown in dotted lines at $f'$ Figs..6 and 8, the end of the cross girder $j'$ is secured to the guide $l^2$ by means of countersunk rivets passing through its flanges.

The water wheel may be of skeleton form, the dash plates $m'$ being secured to the cheeks $n'$ and $o'$; the cheeks or disks could be built up in segments and bolted to the central boss; we show and describe this class of water wheel nevertheless any other design of water wheel can be used when combined with our new mechanism, and motion is conveyed from the floating water wheel by means of a chain or rope $p'$ from the sheave or driving wheel $t'$ to the sheave $u'$. The tubular casing can be built in one piece or in cast or wrought sections bolted together by means of flanges $q'$ and is made to rest upon a concrete foundation; water to operate the buoys passes into the casings through the slots $k'$.

The reversing gear is carried by a frame (f) bolted to the platform $c'$.

The reversing crab is worked by means of a lever $r'$ pivoted at $v'$ and having its lower end terminating in a submerged disk or paddle $s'$ so that the paddle is moved at each turn of the tide to the side toward which the tide is flowing causing a corresponding movement at upper end of lever which end of lever communicates with the reversing crab.

In the enlarged views Figs. 9 and 10 of the reversing crab arrangement the bevel wheel $a$ driven by the sheave $u'$ through shaft $b'$, gears into bevel wheels $b$ and $c$ causing them to rotate on or with the shaft $d$ in opposite directions to each other; both wheels $b$ and $c$ have clutches formed upon their inner faces; the crab $e$ slides over a feather on the shaft $d$; the pulley $h$ on shaft $d$ by means of belts communicates motion to a dynamo or other machinery; the lever $g$ conveys the movement of lever $r'$, to the crab $e$; Fig. 9 shows the crab and lever in the central position the crab being out of gear with each wheel $b$ and $c$; the incoming tide by means of the paddle $s'$ and levers $r'$ and $g$ moves the crab into gear with the clutch on wheel $b$, the shaft $d$ and driving wheel $h$ then rotate in the same direction as wheel $b$ but at the out-going of the tide with the water wheel rotating in the opposite direction the crab is slid over by lever $g$ to gear with the clutch on wheel $c$ and wheel $c$ now rotating in the direction wheel $b$ previously rotated causes the shaft $d$ and pulley $h$ to rotate in the same direction as before.

Having now described our invention what we claim as new and desire to secure by Letters Patent is

1. In tidal motors having a floating water wheel; four tubular float casings $f'$ provided with slots $k'$ each containing a float $e'$, carrying a standard $g'$; a machinery floor $c'$ carried by the standards $g'$; guides $l'$ and $l^2$ connected to standards $g'$ and free to work in slots $k'$; a cross girder $j'$ secured to standards $g'$ and carrying bearings $h'$; in combination with a water wheel and its shaft $a'$, sheave or pulley $t'$ and sheave or pulley $u'$.

2. In tidal motors, the combination of a water wheel, a bevel wheel reversing gear driven thereby, and a frame carrying said gear of a lever $r'$ having its top end pivoted at $v'$, a submerged paddle $s'$ attached to the lower end of lever $r'$, a lever $g$ attached to the top pivoted end of lever $r'$ and engaging with a crab $e$ on the secondary shaft $d$ of the reversing gear to engage and disengage the crab $e$ with bevel wheels $b$ and $c$, substantially as described.

In witness whereof we have hereunto set our hands in the presence of two witnesses.

JOHN TIBBITTS.
ALFRED WILLIAM TURNER.

Witnesses:
ALBERT E. SIMONS,
GUS. J. H. BRADLEY.